US012632538B2

(12) United States Patent
Shamis et al.

(10) Patent No.: US 12,632,538 B2
(45) Date of Patent: May 19, 2026

(54) ENCLAVE CLONING

(71) Applicant: Microsoft Technology Licensing, LLC, Redmond, WA (US)

(72) Inventors: Alexander Shamis, Cambridge (GB); Yoshimichi Nakatsuka, Irvine, CA (US); Peter Robert Pietzuch, Cambridge (GB); Andrew James Paverd, Cambridge (GB); Ercan Ozturk, Irvine, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 17 days.

(21) Appl. No.: 18/703,325

(22) PCT Filed: Sep. 23, 2022

(86) PCT No.: PCT/US2022/044465
§ 371 (c)(1),
(2) Date: Apr. 19, 2024

(87) PCT Pub. No.: WO2023/064082
PCT Pub. Date: Apr. 20, 2023

(65) Prior Publication Data
US 2025/0005136 A1     Jan. 2, 2025

(30) Foreign Application Priority Data

Oct. 13, 2021    (EP) .................................... 21202511

(51) Int. Cl.
G06F 21/00        (2013.01)
G06F 21/53        (2013.01)
(52) U.S. Cl.
CPC ........ G06F 21/53 (2013.01); G06F 2221/033 (2013.01)

(58) Field of Classification Search
CPC ... G06F 21/53; G06F 2221/033; G06F 9/4856
See application file for complete search history.

(56) References Cited

U.S. PATENT DOCUMENTS

| | | | |
|---|---|---|---|
| 9,461,994 B2 | 10/2016 | Scott-Nash | |
| 9,942,035 B2 | 4/2018 | Rozas | |

(Continued)

FOREIGN PATENT DOCUMENTS

| | | |
|---|---|---|
| EP | 3572938 A1 | 11/2019 |

OTHER PUBLICATIONS

Alder, et al., "Migrating SGX Enclaves with Persistent State", In 48th Annual IEEE/IFIP International Conference on Dependable Systems and Network, Jun. 25, 2018, pp. 195-206.

(Continued)

*Primary Examiner* — Ghazal B Shehni
(74) *Attorney, Agent, or Firm* — Barta Jones, PLLC

(57)        ABSTRACT

A source enclave of a source application includes: at least one process thread; a respective at least one process stack memory; a heap memory; and a thread context area. An interrupt is sent to the source enclave which causes the process thread to exit. A migrator thread is sent to the source enclave to save to an external memory, using a migrator stack memory, the thread context area, the at least one process stack memory, and the heap memory, but not the migrator stack memory. A destination enclave is instantiated at a destination application. An initiator thread is sent to the destination enclave to clone, using an initiator stack memory, the state of the source enclave from the external memory.

20 Claims, 7 Drawing Sheets

(56) References Cited

U.S. PATENT DOCUMENTS

| | | | |
|---|---|---|---|
| 10,911,451 B2 | 2/2021 | Costa | |
| 2018/0373553 A1 | 12/2018 | Connor | |
| 2021/0019166 A1 | 1/2021 | Kataria et al. | |
| 2021/0232676 A1* | 7/2021 | Gingell | G06F 21/62 |
| 2022/0245237 A1* | 8/2022 | Briongos | G06F 21/53 |

OTHER PUBLICATIONS

Castro, et al., "Proactive Recovery in a Byzantine-Fault-Tolerant System", In Proceedings of the 4th conference on Symposium on Operating System Design & Implementation, Oct. 22, 2000, 15 pages.

Chuang, et al., "A Network Model of Immigration: Enclave Formation Vs. Cultural Integration", American Institute of Mathematical Sciences, vol. 14, Issue No. 1, Mar. 2019, pp. 53-77.

Clark, et al., "Live migration of virtual machines", In Proceedings of the 2nd conference on Symposium on Networked Systems Design & Implementation, vol. 2, May 2, 2005, 14 pages.

Extended Search Report Issued in European Application No. 21202511.8, mailed on Apr. 13, 2022, 13 pages.

Gu, et al., "Secure Live Migration of SGX Enclaves on Untrusted Cloud", In 47th Annual IEEE/IFIP International Conference on Dependable Systems and Networks (DSN), 2017, 12 pages.

Guerreiro, et al., "TEEnder: SGX enclave migration using HSMs", In Journal of Computers & Security, vol. 96, May 25, 2020, 47 pages.

International Search Report and Written Opinion received for PCT Application No. PCT/US2022/044465, Dec. 2, 2022, 13 pages.

Park, et al., "Toward Live Migration of SGX-Enabled Virtual Machines", In IEEE World Congress on Services Computing, Jun. 27, 2016, pp. 111-112.

Soriente, et al., "ReplicaTEE: Enabling Seamless Replication of SGX Enclaves in the Cloud", arXiv:1809.05027, Sep. 13, 2018, 14 pages.

Weisse, et al., "Foreshadow-NG: Breaking the Virtual Memory Abstraction with Transient Out-of-Order Execution", accessed on link https://foreshadowattack.eu/foreshadow-NG.pdf, Aug. 14, 2018, 7 pages.

Yip, et al., "Getting Started with AWS Nitro Enclaves on Microsoft Windows", accessed on link https://aws.amazon.com/blogs/compute/getting-started-with-aws-nitro-enclaves-on-microsoft-windows/, Apr. 28, 2021, 6 pages.

* cited by examiner

ENCLAVE CLONING

BACKGROUND

Cloud computing refers to the use of one or more remote servers to store, manage, and process data. This can lead to privacy and security concerns when the servers are owned and managed by a different entity from that wishing to take advantage of cloud computing on those servers. This is especially the case when the code running in cloud platform and collected data are sensitive and must be protected.

It is with this in mind that technologies have been developed, commonly known as "Trusted Execution Environments" (TEEs), which allow applications to run in an environment isolated from the rest of the server on which it is run. Examples of TEEs are Intel SGX and ARM Trust-Zone. The isolated environment is commonly referred to as an "enclave".

SUMMARY

According to a first aspect disclosed herein, there is provided a method of saving a state of a source enclave of a source application, the source enclave including: at least one source process thread; a respective at least one source process stack memory being local memory for use only by a respective source process thread; a source heap memory being a global memory for use by each source process thread; and a source thread context area being a memory storing the current context of the at least one source process thread; the method comprising: sending at least one interrupt to the source enclave which causes the at least one source process thread to exit the source enclave; and sending a migrator thread to the source enclave, the migrator thread having a respective migrator stack memory within the source enclave, and being configured to enact a migration function to save the state of the source enclave to a memory outside of the source enclave; wherein the migrator thread is configured to enact said migration function using the migrator stack memory and not the source heap memory or any source process stack memory; wherein the state of the source enclave which is saved by the migrator thread includes the source thread context area, the at least one source process stack memory, and the source heap memory, but does not include the migrator stack memory.

The migration function enacted by the migrator thread may comprise encrypting the state of the source enclave before saving the encrypted state of the source enclave to the external memory. According to a second aspect disclosed herein, there is provided a method of replicating a source enclave, the state of the source enclave having been saved to a memory using the method of the first aspect, the method of the second aspect comprising: instantiating a destination enclave at a destination application, the destination enclave including: at least one destination process thread; a respective at least one destination process stack memory; a destination heap memory; and a destination thread context area; sending at least one interrupt to the destination enclave which causes the at least one destination process thread to exit the destination enclave; and sending an initiator thread to the destination enclave, the initiator thread having a respective initiator stack memory within the destination enclave, and being configured to enact an initiation function to clone the state of the source enclave from the memory outside of the source enclave to the destination enclave; wherein the initiator thread is configured to enact said initiation function using the initiator stack memory and not the destination heap memory or any destination process stack memory.

The initiation function enacted by the initiator thread may comprise decrypting the state of the source enclave.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

In the context of the present disclosure, the term "cloning" (also known as "forking") refers to creating a copy of an application, typically at a different host from the one running the initial or "source" application. The term "migration" refers to a similar process, but in which the source application is destroyed, leaving only the new copy or "destination" application.

In existing techniques for migrating and/or cloning an application comprising an enclave, execution of the application cannot be "paused" at an arbitrary point and continued from that point following migration/cloning. For example, a simple program implementing a counter from zero to a million, upon migration/cloning at an intermediate value, would restart from zero rather than continuing from the intermediate value. It would be desirable to implement migration and/or cloning of an application comprising an enclave in such a manner.

Figure 1:
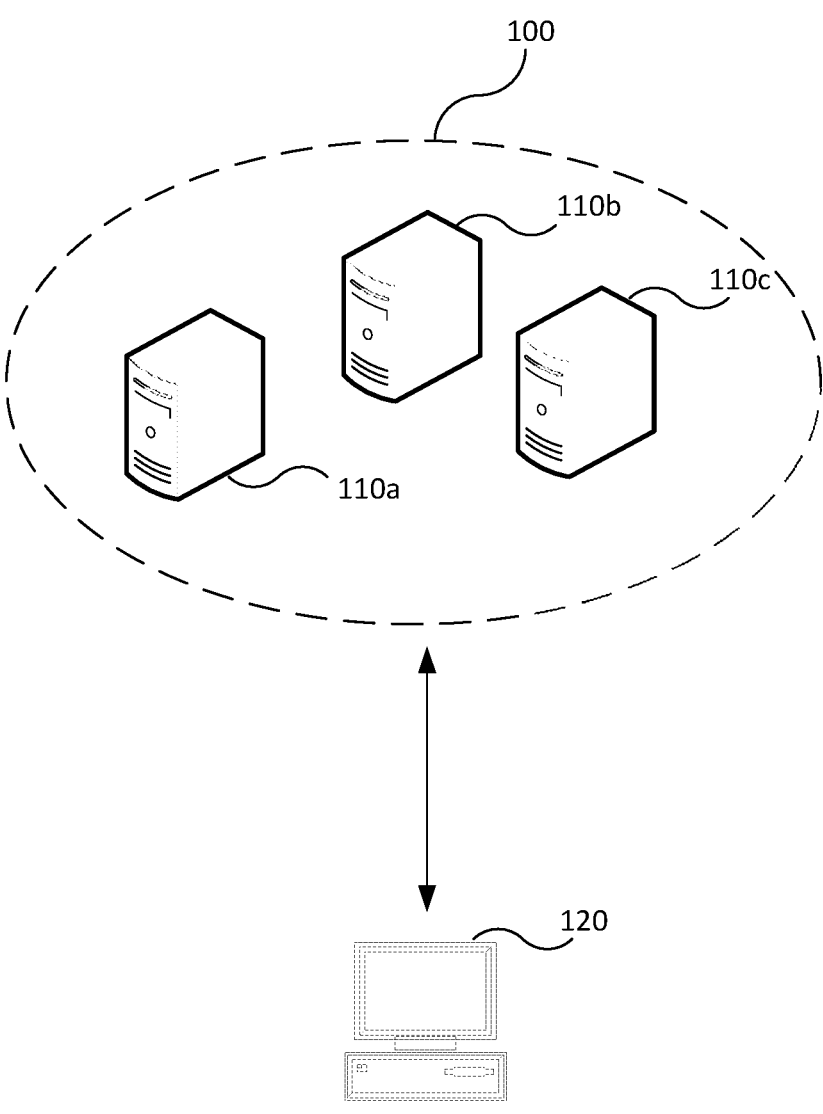
FIG. 1 shows schematically a cloud computing environment comprising a plurality of hosts.

FIG. 1 shows schematically a cloud computing environment 100 comprising a plurality of hosts 110a-c ("servers"). An application hosted on one or more of the hosts 110 may be accessed by a computer system 120. For various reasons it can be advantageous to clone or migrate an application from one of the plurality of hosts 110 (called the "source host") to another of the plurality of hosts 110 (called the "destination host"). For example, this can allow maintenance work on the source host, can provide for load balancing, etc.

Figure 2:
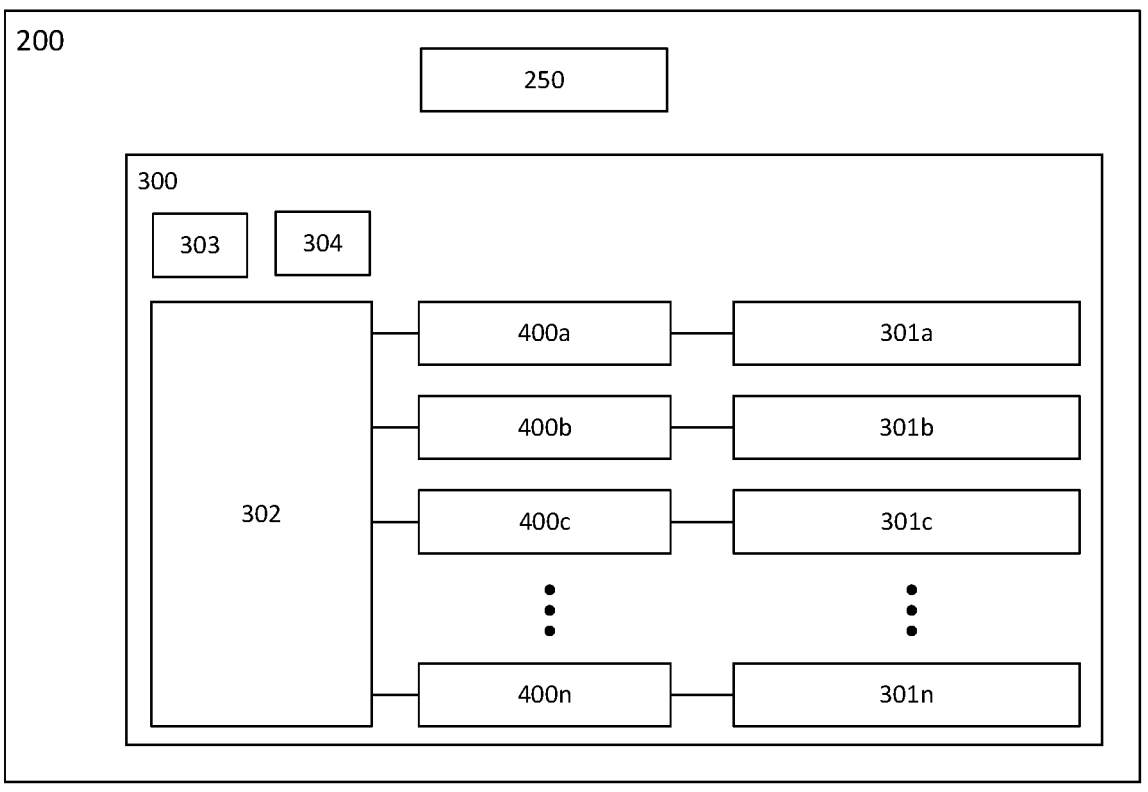
FIG. 2 shows schematically a source application.

FIG. 2 shows schematically a source application 200 running on a source host (one of the hosts 110 shown in FIG. 1). The source application 200 comprises a source enclave 300. The source enclave 300 is a TEE running within the source application 200. The source enclave 300 may be provided by known TEE mechanisms, examples of which include Intel SGX and ARM TrustZone. Also shown in FIG. 2 is a memory 250. As will be described below, the memory 250 will be used to store the state of the source enclave 300. The memory 250 is located outside of the source enclave 300. It is appreciated that in examples the memory 250 may reside in different locations within the cloud computing environment 100. In the example of FIG. 2, the memory 250 is a memory of the source application 200. In other examples, the memory 250 may be located elsewhere on the source host, separate from the source application 200. In yet other examples, the memory 250 may be located on a device other than the source host (e.g. another of the hosts, such as a destination host described later below).

As shown in FIG. 2, a plurality of threads 400 are running within the source enclave 300. The source enclave 300 comprises a data section 304. The data section 304 is a data storage for holding data to be processed by the process threads 400. Specifically, the data section 304 contains initialized static variables (global/local), which have a defined value and are modifiable.

The source enclave 300 also comprises a heap memory 302 (dynamically allocated memory for use by any of the process threads 400) and a respective plurality of process stack memories 301 (one for use by each respective process thread 400). In operation, the process threads 400 operate on data stored in the data section 304, holding local variables in their respective stack memory 301 and global variables in the heap memory 302.

The source enclave 300 also comprises a thread context area 303. The thread context area 303 is a region of memory within the source enclave 300 for saving the execution context of the process threads 400 if they are interrupted. It is appreciated that any TEE that can be interrupted at an arbitrary point in its execution requires a protected memory in which to temporarily store the state of the interrupted thread, until it is resumed. That memory is what is referred to herein as the thread context area 303. One important aspect of such a memory (thread context area) is that it must be protected to prevent modification by software outside the enclave.

An example of a thread context area is the so-called "state save area (SSA)" in an SGX implementation. The SSA is protected by virtue of being within the enclave in SGX. In an SGX implementation, the SSA is used to store Thread Local Storage (TLS) and GPRSGX when the source enclave 300 is interrupted. GPRSGX comprises various register values at the time of the interrupt, as well as the URSP and URBP values, which indicate the stack and base pointer values when returning from an ECALL.

Within an SGX enclave, there are one or more data structures called Thread Control Structures (TCSs). Any thread that enters the enclave does so by providing a reference to an available (i.e. not in use by another thread) TCS. Each TCS maintains a pointer to a corresponding SSA, and an integer value (the Current SSA or "CSSA") indicating the offset within the SSA at which the most recently-interrupted thread's data is stored.

There are four phases to enclave migration as described herein:

PREPARATION PHASE (optional): this phase initializes variables within the enclave used for migration;

DUMP PHASE: this phase collects, optionally encrypts, and exports all necessary data from the source enclave;

RESTORE PHASE: this phase imports, optionally decrypts, and restores all data to the destination enclave; and CLEANUP PHASE (optional): this phase cleans up data structures (e.g. buffers) used for migration.

It is noted that the dump phase on its own has advantages in that it allows the state of the source enclave to be saved to a memory outside of the source enclave. This allows the source enclave to be stored and/or transmitted while "paused" at an arbitrary point. Indeed, the source enclave may be stored indefinitely, and could be cloned and restored at a much later time and/or by an entirely different entity from that which initially paused the source enclave.

The preparation phase is optional. It may comprise e.g. initializing variables within the source enclave 300, specifically allocating any required memory, initializing memory address location/size of enclave data section. In examples, the preparation phase may also include initializing encryption context (e.g. encryption keys, etc.).

Figure 3:
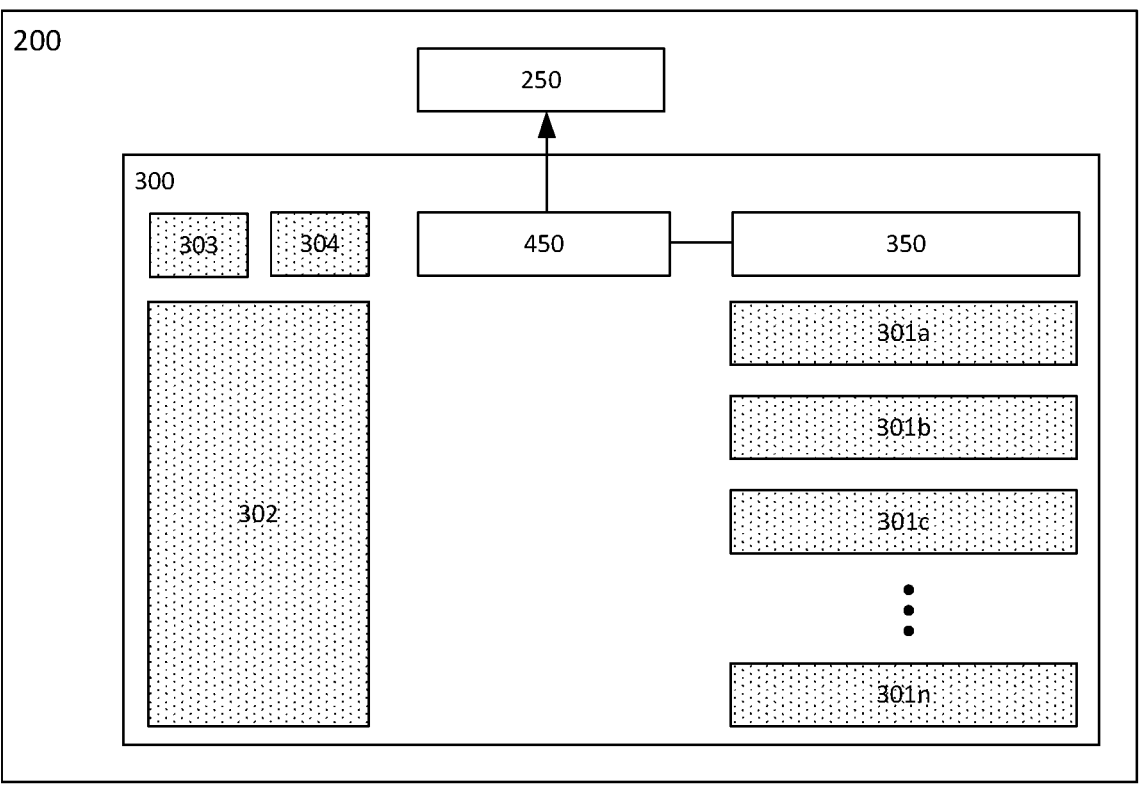
FIG. 3 shows schematically a source enclave undergoing a dump phase.

The dump phase will now be explained with reference to FIG. 3 and FIG. 4. FIG. 3 shows schematically the source enclave 300 undergoing the dump phase, and FIG. 4 shows schematically a process flow between the source application 200 and the source enclave 300 during the dump phase.

During the dump phase, all process threads 400 within the source enclave 300 are halted and a special "migrator thread" 450 is used to collect and export the data of the process threads 400. That is, the migrator thread 450 is similar to the process threads 400 except that it is specially configured to perform a migration function as will be described below, i.e. the migrator thread 450 executes a specific piece of code that deals only with migration.

As shown in FIG. 3, the migrator thread 450 has its own respective stack memory 350. The migrator thread 450 is able to pass data from within the enclave 300 to the memory 250 of the host application 200. This allows the internal data of the source enclave 300 to be accessed even when security guarantees of the source enclave 300 do not allow external access of its internal data.

Figure 4:
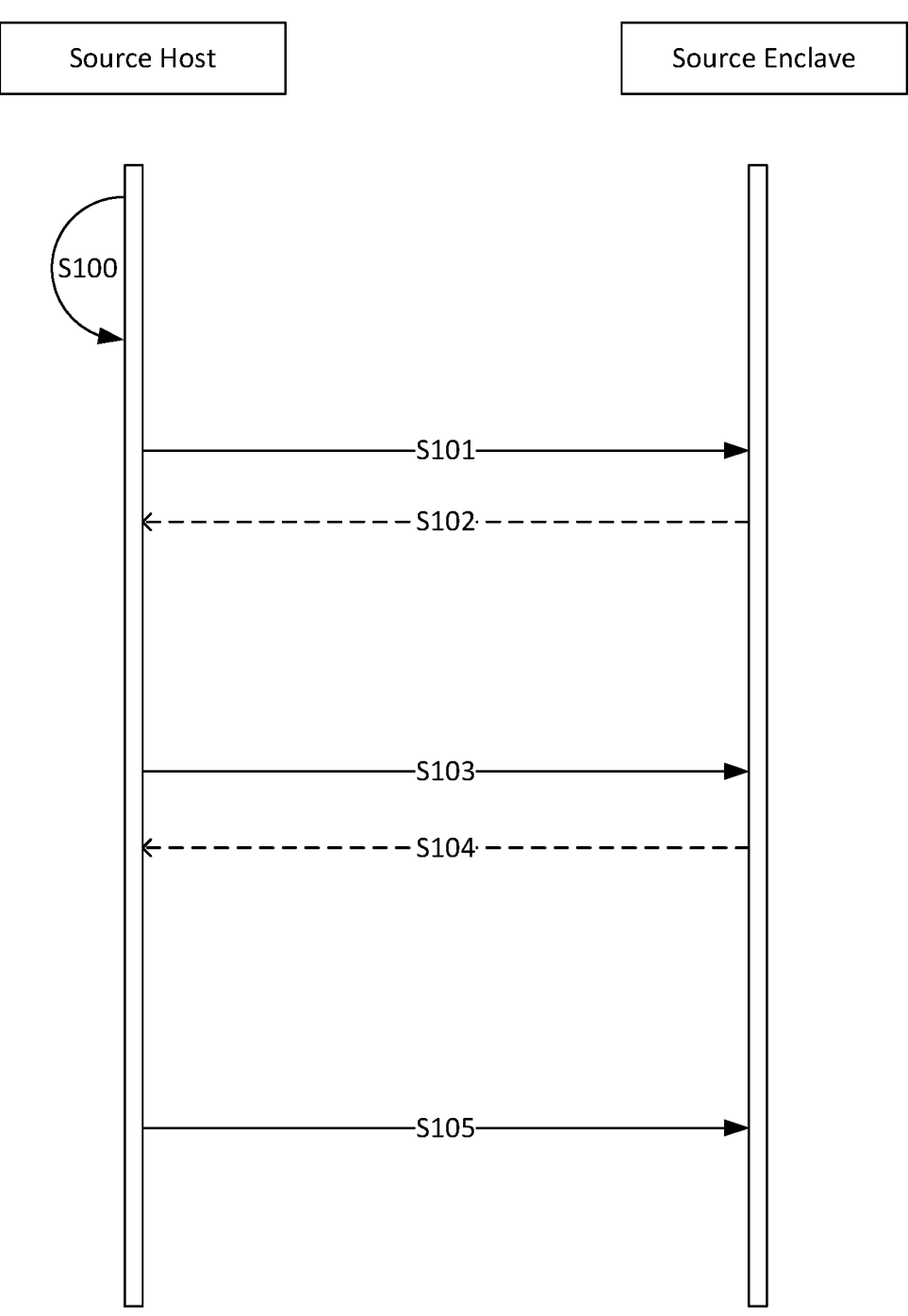
FIG. 4 shows schematically a process flow between a source application and a source enclave during the dump phase.

Turning now to the process flow of FIG. 4, at S100, the source application 200 sets an IS_HOST MIGRATING flag indicating that it is going to halt the enclave thread right before interrupting the thread. This will be explained later below. The IS_HOST_MIGRATING flag is maintained outside of the source enclave 300.

At S101, one or more interrupts are sent to the source enclave 300 (i.e. to each process thread 400 of the source enclave 300) to cause the one or more process threads 400 to exit the source enclave 300, which they do at S102. Before exiting the source enclave 300, the process threads 400 save their state to the thread context area 303. In examples, an interrupt per process thread 400 may be sent to the source enclave 300 (each interrupt causing a different respective one of the process threads 400 to exit the source enclave 300). In any event, all of the process threads 400 are caused to exit the source enclave 300 such that no process threads 400 remain within the source enclave 300. One potential way of implementing these steps will be described later below. Once the process threads 400 have exited the source enclave 300, the source enclave 300 is "paused". The one or more interrupts may be sent to the source enclave 300 by a kernel of the source application 200, initiated by the source application 200 (i.e. the kernel in charge of scheduling at the source application 200).

At S103, the migrator thread 450 enters the source enclave 300. The migrator thread 450 may be sent to the source enclave 300 by the kernel of the source application

200. The migrator thread 450 is configured to enact a migration function to save the state of the source enclave 300 to the memory 250. In examples, one of the process threads 400 which exited the source enclave 300 at S101 may be reconfigured as the migrator thread 450 which enters the source enclave 300 at S103. The state of the source enclave 300 which is saved by the migrator thread 450 includes the thread context area 303, the process stack memories 301, and the heap memory 302. These elements are shaded in FIG. 3 to illustrate the state of the source enclave 300. In examples, the migrator thread 450 may save any section of memory that could have been modified by the application (e.g. the data section 304).

In examples, the state of the source enclave 300 which is saved by the migrator thread 450 may also include code data. In other examples, it may be assumed that the source application 200 and source enclave 300 are identical to the destination application 500 and destination enclave 600, in which case the code data do not need to be saved by the migrator thread 450.

The migrator stack memory 350 is a specific memory location allocated for use by the migrator thread 450 to enact the migration function, i.e. the migrator function 350 is configured to enact the migration function using (only) the migrator stack memory.

Specifically, the migrator thread 450 does not make any modifications to values stored in any of the process stack memories 301, heap memory 302, thread context area 303, or data section 304. This means, for example, that the migrator thread 450 must not allocate any space in the heap memory 302. Configuring the migrator thread 450 in this way ensures that the migrator thread 450 does not perturb the state of the source enclave 300. Note that the migrator stack memory 350 is not needed to clone the source enclave 300, and does not form part of the "state" of the source enclave 300 which is saved by the migrator thread 450.

At S104, the state of the source enclave 300 is saved to the memory 250 by the migrator thread 450. In examples, the state of the source enclave 300 may be encrypted by the migrator thread 450 before leaving the source enclave 300. This is particularly advantageous when the memory 250 is an external memory (external to the source enclave 300). As mentioned, encryption keys for doing this may be initialized during the preparation phase. As a specific example, the AES GCM symmetric encryption algorithm may be used. Generally, the encryption may be performed using an authenticated encryption mode or algorithm (or an equivalent scheme for authenticating the encrypted data). An advantage of this is that it allows for modifications to the encrypted data to be detected by the destination enclave 600 upon decryption.

Following the export of the (potentially encrypted) state of the source enclave 300 at S104, the source enclave 300 has been "copied". Because the process threads 400 were interrupted and their states (including in particular the thread context area 303 and stack memories 301) were saved, it is possible to resume the source enclave 300 precisely from the point it was interrupted. For example, a simple program running in the source enclave 300 which counts from 0 to 1,000,000 is able to be paused at an intermediate value n (0<n<1,000,000) and resumed from that same value n at a later time. Similarly, a copy of the source enclave 300 at a destination enclave 600 (described later below) can also be resumed from that same value n.

In addition to the state of the source enclave 300, in examples, migrator thread 450 may also store metadata relating to the source enclave 300. An example of such metadata is the number of destination process threads 450 which were interrupted at the source enclave 300. The metadata may be stored to the same memory 250 as the state of the source enclave 300, or may be stored in a different memory location. The metadata may or may not be encrypted.

A potential way of implementing steps S101 and S102 (to pause the source enclave 300) will now be described. For the purposes of explanation, it is assumed that the source enclave 300 is implemented using Intel SGX.

Within SGX, steps S101 and S102 may be implemented using the Asynchronous Exit (AEX). AEX is implemented in SGX to allow an enclave thread to be interrupted and resumed. In the present disclosure, the interrupt sent to the source enclave 300 at S101 causes the source enclave 300 to "artificially" AEX. However, this raises two issues:

AEX itself is not sufficient to halt the source enclave 300. This is because an interrupted enclave thread (i.e. any thread running in the enclave, including any of the process threads 400 and/or the migrator thread 450) is, in Intel SGX, expected to return to the enclave via ERESUME immediately after the interrupt is resolved. A simple solution is to prevent the enclave thread from going back to the enclave by causing it to wait (e.g. by putting it into a loop aka busy-waiting, busy-looping, or spinning), only releasing it once the migrator thread 450 has finished its operation; and there is no way to distinguish between the intentional ("artificial") AEX and the one that happens naturally.

The second issue causes several complications, combined with the solution to the first issue. For example, the migrator thread 450 can be interrupted by a "natural" interrupt during the migration operation, causing it to hang during its operation. The two issues can be solved using three flags: IS_HOST_MIGRATING; HAS_ENTERED_ENCLAVE; and ALLOW_ERESUME.

The host application 200 first, at S100 mentioned above, sets the IS_HOST MIGRATING flag indicating that it is going to halt the enclave thread right before interrupting the thread. This flag causes any interrupted enclave thread to wait (e.g. be kept in a loop), which is conditioned to break when the ALLOW_ERESUME flag is set to true. Then, the HAS_ENTERED_ENCLAVE flag is set immediately before the migrator thread 450 enters the source enclave 300. This flag prevents the migrator thread 450 being captured in the wait (e.g. loop) if it gets interrupted by jumping directly to the ERESUME instruction.

These three flags are stored outside the source enclave 300 so that they can be read by the busy-wait loop which prevents the source process threads 400 from re-entering the source enclave 300. As such, the flags are not secure in the sense that e.g. a dishonest host (e.g. the source application 200) could potentially interfere with it. To address this, two steps may be taken:

an in-enclave flag (i.e. a flag within the source enclave 300) may be provided that gets set at S100 e.g. by the source application 200 running a secure function call (e.g. a so-called "ECALL" within an SGX implementation). This in-enclave flag is checked at the start of any subsequent secure function calls to the source enclave 300 and, if set, prevents them. That is, the in-enclave flag prevents secure function calls by the source application 200 after migration has started.

the source application 200 must prevent any of the process threads 400 from resuming during the migration. This can be done, for example, by setting the stored instruction pointers in the other thread context areas (SSAs) to zero. Alternatively, this can also be done by setting the stored instruction pointers in the other thread context areas to point to a trap-loop function.

As mentioned above, once the state of the source enclave 300 has been saved to the memory 250, the source enclave 300 has been "copied". Assuming that the memory 250 is an external memory, the source enclave 300 at this point can optionally be terminated. On the other hand, if the intention is to clone the source enclave 300, then the source enclave 300 may be resumed at S105, as shown in FIG. 4. This can be achieved, as an example, by asserting the ALLOW_ERE-SUME flag described above.

The restore phase will now be described with reference to FIGS. 5, 6 and 7.

As will be described below, during the restore phase, the destination enclave 600 is set up at the destination application 500. The destination enclave 600 has a similar structure to the source enclave 300. A special "initiator thread" 650 is used to import the saved enclave state from the memory 250 into the destination enclave 600.

The destination application 500 is an application other than the source application 200 running on a destination host (one of the hosts 110 shown in FIG. 1). The destination host and source host may be the same host or may be different hosts. In particular, the destination application 500 and source application 200 may be running on the same machine (host), or may be running on different machine (hosts). When running on the same machine, it is appreciated that the destination application 500 and source application 200 may share a kernel (although in other examples they may each have their own respective kernel).

Figure 5:
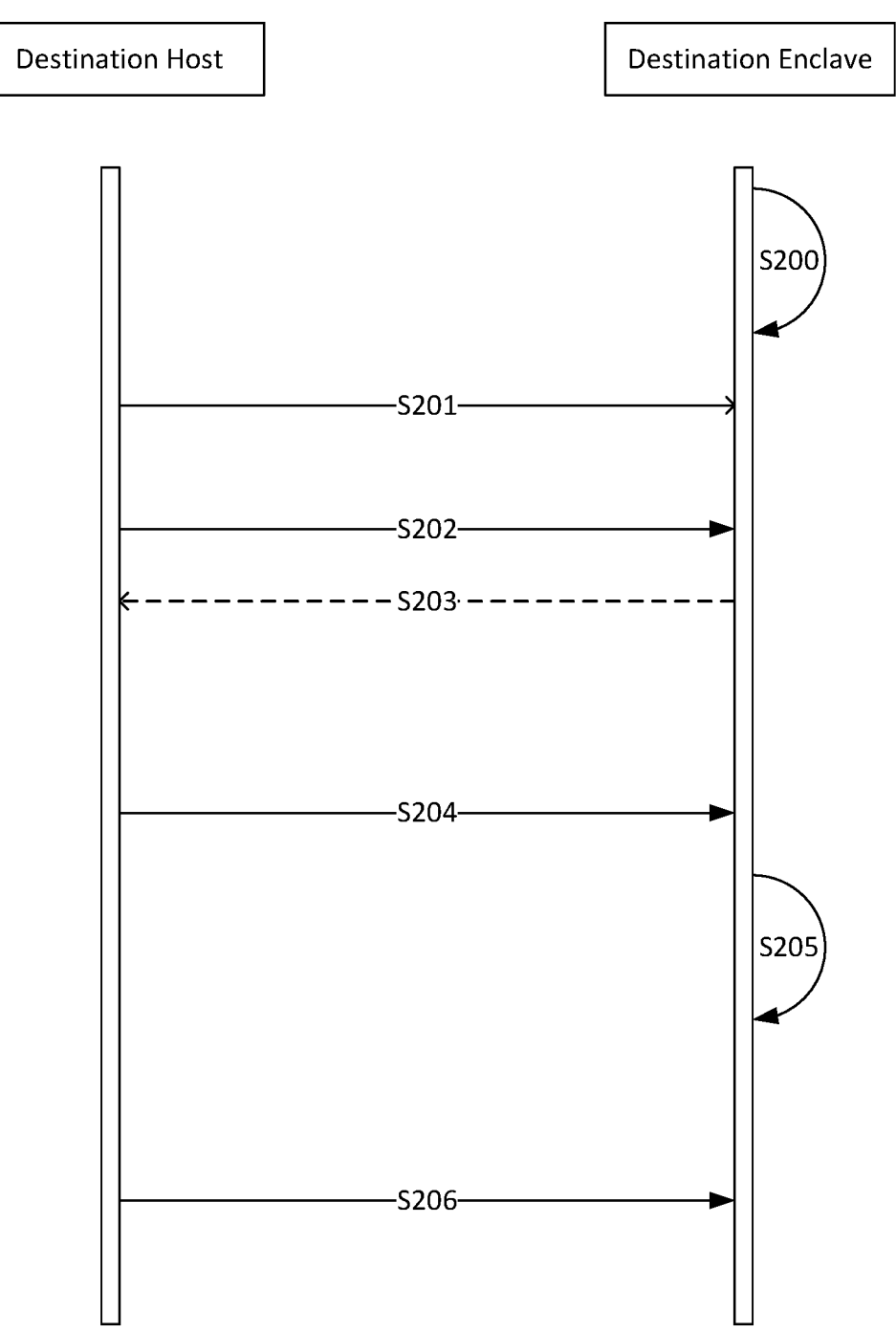
FIG. 5 shows schematically a process flow between a destination application and a destination enclave during the restore phase.
Figure 6:
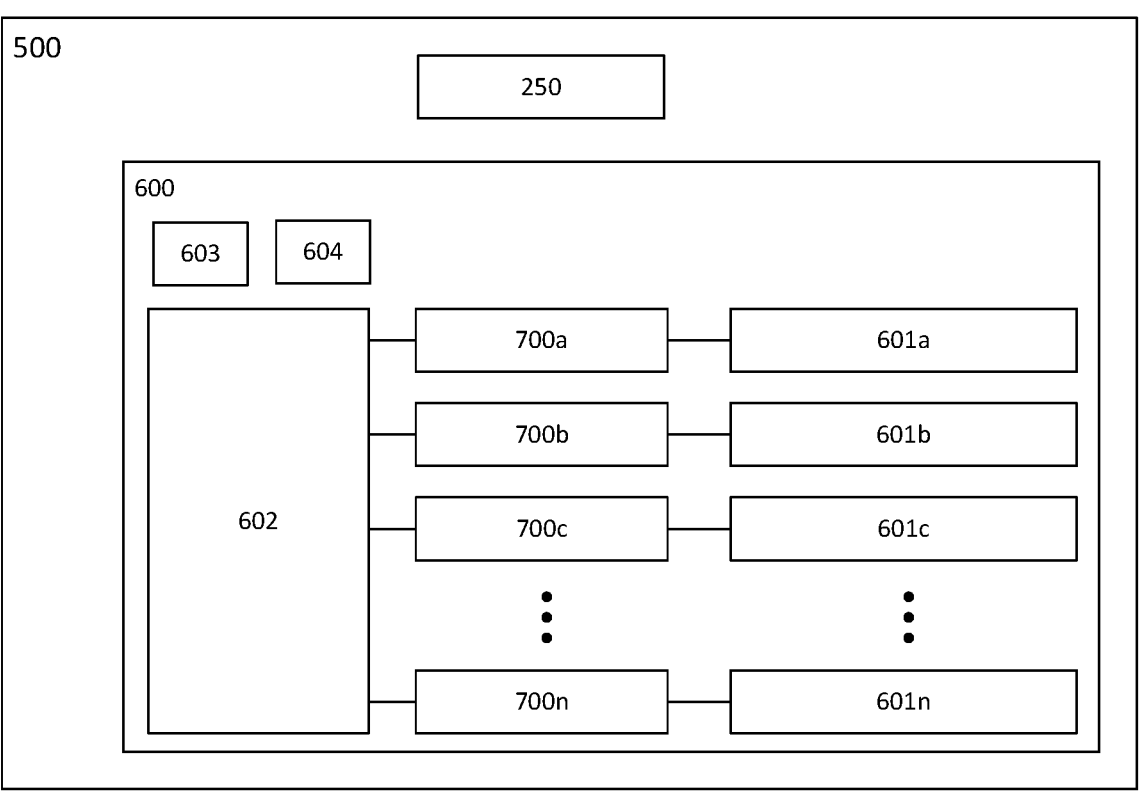
FIG. 6 shows schematically a destination application.

FIG. 5 shows schematically a process flow between the destination application 500 and the destination enclave 600 during the restore phase.

S200, the destination enclave 600 is instantiated at the destination application 500. The destination enclave 600 may be instantiated by a kernel of the destination application 500.

At S201, one or more destination process threads 700 enter the destination enclave 600. The destination process threads 700 may be sent to the destination enclave 600 by the kernel of the destination application 500. The destination process threads 700 that enter at S201 are "placeholder" or "dummy" process threads, the number of which is the same as the number of process threads 400 from the source enclave 300. An example of a destination enclave 600 instantiated at the destination application 500 with the destination process threads 700 is shown schematically in FIG. 6.

These dummy process threads do not perform any particular function (e.g. they could execute an infinite loop within the destination enclave 600). Rather, the dummy process threads are caused to enter the destination enclave 600 so that the CPU sets the control structures to the correct values. To use SGX as an example, when the source enclave is dumped, the TCS(s) will be in a certain state (e.g. will have certain CSSA values). When the enclave is restored, the TCS(s) in the destination enclave should be in the same state. However, it is not possible to read or write data to the TCS, even from within the enclave itself (only the CPU can do this). Hence, an advantage of the dummy threads entering and then being interrupted is that the TCS(s) in the destination enclave 600 will be in the correct state.

The destination enclave 600 has a stack memory 601 per destination process thread 700, a destination heap memory 602, a destination thread context area 603, and a destination data section 604. These elements correspond to those of the source enclave 300 already described above.

At S202, one or more interrupts are sent to the destination enclave 600 to cause the one or more destination process threads 700 to exit the destination enclave 600, which they do at S203. The interrupts may be sent to the destination enclave 600 by the kernel of the destination application 500. Generally, one interrupt may be required per destination process thread 700. In any event, all of the destination process threads 700 are caused to exit the destination enclave 600 such that no destination process threads 700 remain within the destination enclave 600. Once the destination process threads 700 have exited the destination enclave 600, the destination enclave 600 is "paused". This may be implemented in a corresponding manner to as described above in relation to pausing the source enclave 300.

At S204, the initiator thread 750 enters the paused destination enclave 600. This is shown schematically in FIG. 7. The initiator thread 750 is configured to enact an initiation function to clone the state of the source enclave 300 from the memory 250 to the destination enclave 600. In examples, one of the destination process threads 700 which exited the destination enclave 600 S203 may be reconfigured as the initiator thread 750 which enters the destination enclave 600 at S204.

Figure 7:
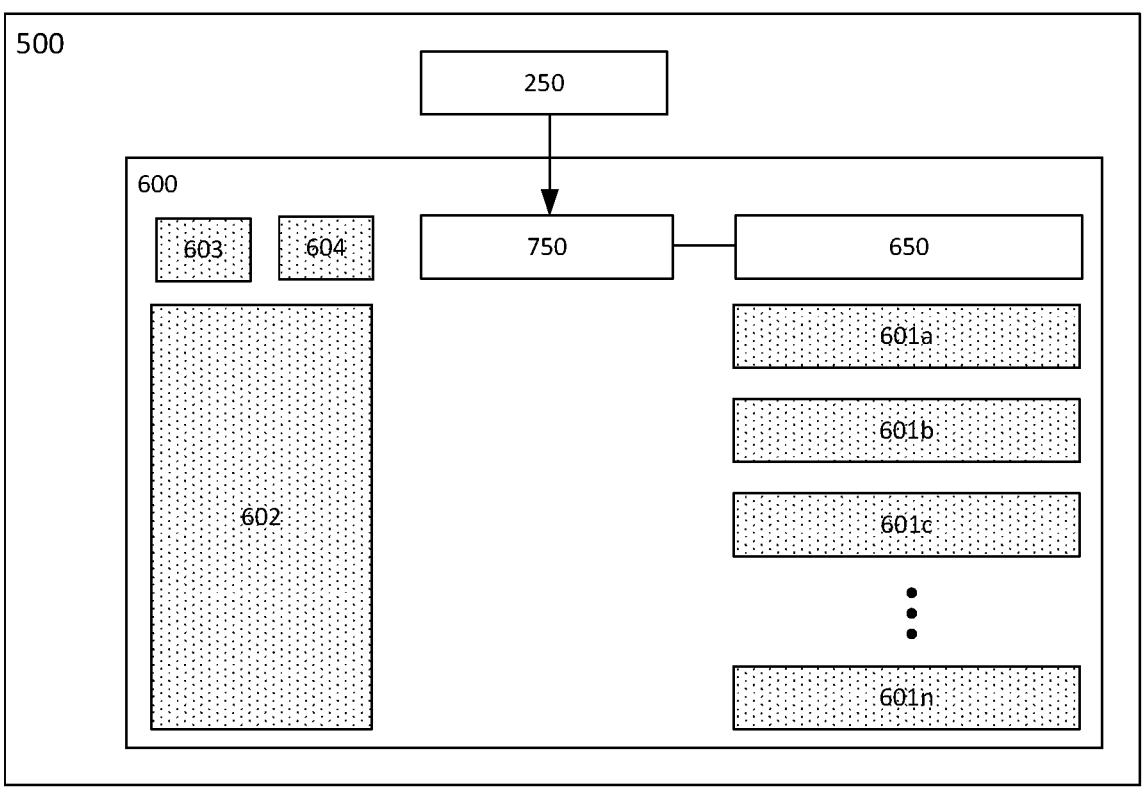
FIG. 7 shows schematically a destination application and destination enclave undergoing a restore phase.

As shown in FIG. 7, the initiator thread 750 has its own stack memory, referred to as the initiator stack memory 650. The initiator stack memory 650 is a specific memory location allocated for use by the initiator thread 750 to enact the initiation function, i.e. the initiator thread 750 is configured to enact the initiation function using (only) the initiator stack memory 650. Similarly to the migrator thread 450 and migrator stack memory 350 described earlier, this means, for example, that the initiator thread 750 must not allocate any heap memory in the destination heap memory 602. Configuring the initiator thread 750 in this way ensures that the initiator thread 750 clones the state of the source enclave 300 without affecting it.

At S205, the state of the source enclave 300 is cloned at the destination enclave 600 by the initiator thread 750. This comprises the initiator thread 750 accessing the memory 250 storing the state of the source enclave 300, and saving the parts of the state of the source enclave 300 to the corresponding locations within the destination enclave 500. Specifically, the initiator thread 750 saves the source thread context area 303 to the destination thread context area 603, the source process stack memory 301 to the destination process stack memories 601, and the source heap memory 302 to the destination heap memory 602. These elements are shaded in FIG. 7 to illustrate the state of the destination enclave 600. In examples, the initiator thread 750 may also save the source data section 304 to the destination data section 604. The initiator stack memory 650 may be deallocated once the initiator thread 750 has enacted the initiation function.

In examples in which the state of the source enclave 300 is encrypted by the migrator thread 450 before leaving the source enclave 300, the initiator thread 750 is also configured to decrypt the state of the source enclave 300 before cloning it at the destination enclave 600. As mentioned, encryption keys for doing this may be initialized during the preparation phase. As mentioned above, the encryption may be performed using an authenticated encryption mode or algorithm (or an equivalent scheme for authenticating the encrypted data), which allows the destination enclave 600 to detect modifications to the encrypted data upon decryption.

In examples, the destination enclave 600 may be configured to cease execution of the initiation function by the initiator thread 750 in response to detecting modification of the encrypted data.

At S206, the destination enclave 600 is resumed. This involves the paused destination process threads 700 reentering the destination enclave 600. This can be achieved, similarly to described above, by asserting a corresponding flag (ALLOW_ERESUME) at the destination enclave 600. The ALLOW_RESUME flag is maintained outside of the destination enclave 600 (is part of the destination application 500).

The destination process threads 700 proceed to act on data in the thread context area 603, stack memories 601, and heap memory 602 stored earlier by the initiator thread 750. Because the source process threads 400 were interrupted and their states (including in particular the thread context area 303 and stack memories 301) were saved, it is possible for the destination enclave 600 to continue from the execution point at which the source enclave 300 was paused at S102. For example, a simple program running in the source enclave 300 which counts from 0 to 1,000,000 is able to be paused at an intermediate value n (0<n<1,000,000) and resumed at the destination enclave 600 from that same value n at a later time.

The cleanup phase is optional, and may comprise e.g. cleaning up or deleting data structures (e.g. buffers) used for migration, destroying threads using for migration (e.g. the migrator thread 450 and/or initiator thread 750) that are not needed anymore.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method comprising:
sending an interrupt to a source enclave of a source application, the source enclave including: a source process thread, a source process stack memory being local memory for use only by the source process thread, a source heap memory being a global memory for use by the source process thread, and a source thread context area being a memory storing a current context of the source process thread, wherein the interrupt causes the source process thread to exit the source enclave; and
sending a migrator thread to the source enclave, the migrator thread having a migrator stack memory within the source enclave, and being configured to enact a migration function to save a state of the source enclave to a memory outside of the source enclave;
wherein the migrator thread is configured to enact said migration function using the migrator stack memory which is an allocated memory location for use by the migrator thread;
wherein the state of the source enclave which is saved by the migrator thread includes the source thread context area, the source process stack memory, and the source heap memory, but does not include the migrator stack memory.

2. The method according to claim 1, wherein said migration function enacted by the migrator thread comprises encrypting the state of the source enclave before saving the encrypted state of the source enclave to the memory outside of the source enclave.

3. The method according to claim 1, comprising:
i) before sending the interrupt to the source enclave, setting a first flag indicating that the source enclave will be interrupted, the first flag causing a thread interrupted from the source enclave to wait while the first flag is set;
ii) setting a second flag indicating that the wait can be ended; and
iii) before sending the migrator thread to the source enclave, setting a third flag indicating that the migrator thread will be sent to the source enclave, the third flag prevents the migrator thread from waiting if the first flag is set.

4. The method according to claim 1, comprising:
before sending the interrupt to the source enclave, setting an in-enclave flag within the source enclave, the in-enclave flag causing any secure function call to the source enclave to be prevented.

5. The method according to claim 1, comprising preventing the source process thread from resuming while the migration function is being enacted.

6. The method according to claim 1, comprising storing metadata indicating a number of source process threads which were interrupted at the source enclave.

7. The method according to claim 1, comprising:

instantiating a destination enclave at a destination application, the destination enclave including: a destination process thread, a destination process stack memory, a destination heap memory, and a destination thread context area;

sending an interrupt to the destination enclave which causes the destination process thread to exit the destination enclave; and sending an initiator thread to the destination enclave, the initiator thread having a initiator stack memory within the destination enclave, and being configured to enact an initiation function to clone the state of the source enclave from the memory outside of the source enclave to the destination enclave;

wherein the initiator thread is configured to enact said initiation function using the initiator stack memory and not the destination heap memory or the destination process stack memory.

8. The method according to claim 7, wherein said initiation function enacted by the initiator thread comprises decrypting the state of the source enclave.

9. The method according to claim 7, comprising deallocating the initiator stack memory after the initiating function has completed.

10. The method according to claim 7, wherein the source application and destination application reside on the same machine.

11. The method according to claim 7, wherein the source application and destination application reside on different machines.

12. The method according to claim 7, comprising storing metadata indicating a number of source process threads which were interrupted at the source enclave, and wherein instantiating the destination enclave comprises reading said metadata and instantiating the destination enclave with a number of destination process threads equal to the number of source process threads.

13. The method according to claim 7, wherein cloning the state of the source enclave comprises the initiator thread saving the source process stack memory to the destination process stack memory, the source heap memory to the destination heap memory, and the source thread context area to the destination thread context area.

14. A device comprising:

a processing apparatus comprising a processor, and a memory comprising a memory unit;

wherein the memory stores computer code arranged to run on the processing apparatus and configured so as when said computer code is run on the processing apparatus, the processing apparatus performs a method comprising:

sending an interrupt to a source enclave of a source application, the source enclave including: a source process thread, a source process stack memory being local memory for use only by the source process thread, a source heap memory being a global memory for use by the source process thread, and a source thread context area being a memory storing a current context of the source process thread, wherein the interrupt causes the source process thread to exit the source enclave; and sending a migrator thread to the source enclave, the migrator thread having a migrator stack memory within the source enclave, and being configured to enact a migration function to save a state of the source enclave to a memory outside of the source enclave;

wherein the migrator thread is configured to enact said migration function using the migrator stack memory which is an allocated memory location for use by the migrator thread;

wherein the state of the source enclave which is saved by the migrator thread includes the source thread context area, the source process stack memory, and the source heap memory, but does not include the migrator stack memory.

15. The device of claim 14, wherein the method further comprises:

i) before sending the interrupt to the source enclave, setting a first flag indicating that the source enclave will be interrupted, the first flag causing a thread interrupted from the source enclave to wait while the first flag is set;

ii) setting a second flag indicating that the wait can be ended; and iii) before sending the migrator thread to the source enclave, setting a third flag indicating that the migrator thread will be sent to the source enclave, the third flag preventing the migrator thread from waiting if the first flag is set.

16. The device of claim 14, wherein the method further comprises:

before sending the interrupt to the source enclave, setting an in-enclave flag within the source enclave, the in-enclave flag causing any secure function call to the source enclave to be prevented.

17. The device of claim 14, wherein the method further comprises:

instantiating a destination enclave at a destination application, the destination enclave including: a destination process thread, a destination process stack memory, a destination heap memory, and a destination thread context area;

sending an interrupt to the destination enclave which causes the destination process thread to exit the destination enclave; and sending an initiator thread to the destination enclave, the initiator thread having an initiator stack memory within the destination enclave, and being configured to enact an initiation function to clone the state of the source enclave from the memory outside of the source enclave to the destination enclave;

wherein the initiator thread is configured to enact said initiation function using the initiator stack memory and not the destination heap memory or the destination process stack memory.

18. The device of claim 17, wherein the source application and the destination application reside on the same machine.

19. The device of claim 17, wherein the source application and the destination application reside on different machines.

20. A computer program embodied on a non-transitory computer-readable medium configured so as when executed by a processing unit to perform a method comprising:

sending an interrupt to a source enclave of a source application, the source enclave including: a source process thread, a source process stack memory being local memory for use only by the source process thread, a source heap memory being a global memory for use by the source process thread, and a source thread context area being a memory storing a current context of the source process thread, wherein the interrupt causes the source process thread to exit the source enclave; and sending a migrator thread to the source enclave, the migrator thread having a migrator stack memory within the source enclave, and being configured to enact a migration function to save a state of the source enclave to a memory outside of the source enclave;

wherein the migrator thread is configured to enact said migration function using the migrator stack memory which is an allocated memory location for use by the migrator thread;

wherein the state of the source enclave which is saved by the migrator thread includes the source thread context area, the source process stack memory, and the source heap memory, but does not include the migrator stack memory.

\* \* \* \* \*